United States Patent [19]

Wang et al.

[11] Patent Number: 5,014,827
[45] Date of Patent: May 14, 1991

[54] ACTUATION PISTON FOR DISC BRAKE WITH VIBRATION ATTENUATOR

[75] Inventors: Yiren S. Wang, Birmingham; Seong K. Rhee, Northville; Robert E. Jokisch, Utica, all of Mich.

[73] Assignee: Allied-Signal Inc., Morristown, N.J.

[21] Appl. No.: 382,454

[22] Filed: Jul. 20, 1989

[51] Int. Cl.⁵ .................... F16D 55/18; F16D 65/78
[52] U.S. Cl. .................... 188/72.4; 188/264 G
[58] Field of Search ............ 188/72.4, 73.35, 73.37, 188/370, 264 G, 71.6; 92/208, 213

[56] References Cited

U.S. PATENT DOCUMENTS

| | | | |
|---|---|---|---|
| 4,401,012 | 8/1983 | Emmett | 188/264 G X |
| 4,513,844 | 4/1985 | Hoffman, Jr. | 188/264 G X |
| 4,537,289 | 8/1985 | Von Grunberg et al. | 188/72.4 |

FOREIGN PATENT DOCUMENTS

| | | | |
|---|---|---|---|
| 1167970 | 10/1969 | United Kingdom | 188/72.4 |
| 2185547 | 7/1987 | United Kingdom | 188/72.4 |

Primary Examiner—Robert J. Oberleitner
Attorney, Agent, or Firm—Leo H. McCormick, Jr.; Ken C. Decker

[57] ABSTRACT

A disc brake assembly (10) having an actuation piston assembly 36 which responds to a hydraulic fluid to provide a force for moving brake pads (42, 44) into engagement with a rotor (12). The actuation piston assembly (36) has an elastomeric ring (66, 166, 266, 366) through which the force is transmitted to a brake pad (42) to attenuate any vibrations that may be created during a brake application and as a result a reduction in audible sound.

2 Claims, 4 Drawing Sheets

ACTUATION PISTON FOR DISC BRAKE WITH VIBRATION ATTENUATOR

This invention relates to an actuation piston assembly through which a force is transmitted to move a brake pad into engagement with a rotor. The actuation piston assembly has an elastomeric ring which attenuates vibrations produced when the brake pad engages the rotor to reduce the creation of audible sounds during a brake application.

Noise generated during a brake application has been increasing as the size of vehicles has been decreasing. Individual noise problems for some vehicles have been reduced through the modification of the ingredients in the composition of material that make up a brake pad and the geometery of the pad. While the modification of the friction material for noise abatement can be satisfactory, most customers and suppliers do not have the time and monies necessary to completely eliminate noise for each brake application.

In U.S. Pat. No. 4,705,146 a method is disclosed for selecting a brake pad corresponding to various vehicle characteristics to reduce noise. This method while satisfactory can not always be incorporated in the design of the brake system since components often change during the design of a new vehicle.

Attempts have been made to mask the noise through the use of sound absorption coatings, such as disclosed in U.S. Pat. No. 3,998,301 which is applied to the back side of a friction pad. While such coatings can be effective, the addition of the coating adds cost to the manufacture and at times because the thickness of the coating has not been uniform or did not cover the entire back side of a pad, undesirable noise still occurred.

In the present invention an actuation piston is modified by the addition of an elastomeric and an actuation ring to communicate the brake force into the brake pad. This resultant actuation piston assembly is located in a bore of the caliper of a disc brake.

In more detail, the actuation piston assembly has a cylindrical member with a closed end and an opened end. The closed end is located in the bore and with the caliper housing forming an actuation chamber which receives hydraulic fluid from a master cylinder to effect a brake application. The elastomeric ring is located adjacent the opened end of the piston and engages a flange on the actuation ring. The brake force applied to the brake pad brings the brake pad into engagement with the rotor. During engagement, vibrations are created as the friction between the brake pad and rotor reduce the rotation of the wheel to which the rotor is attached. The vibrations are carried back through the brake pad to the actuation ring. However, the elastomeric ring attenuates the vibration allowing the actuation ring and piston to move independently and as a result reduces the creation of audible sounds during a brake application.

An advantage of this invention occurs through the addition of an elastomeric ring on an actuation piston to attenuate vibration created through the engagement of a brake pad and rotor to reduce the creation of audible sound during a brake application.

It is an object of this invention to provide a disc brake assembly with means to attenuate vibration carried from a brake pad into an actuation piston to reduce the production of audible sounds.

The advantage and objects of this invention should be apparent from reading the specification while viewing the drawing wherein.

Figure 1:
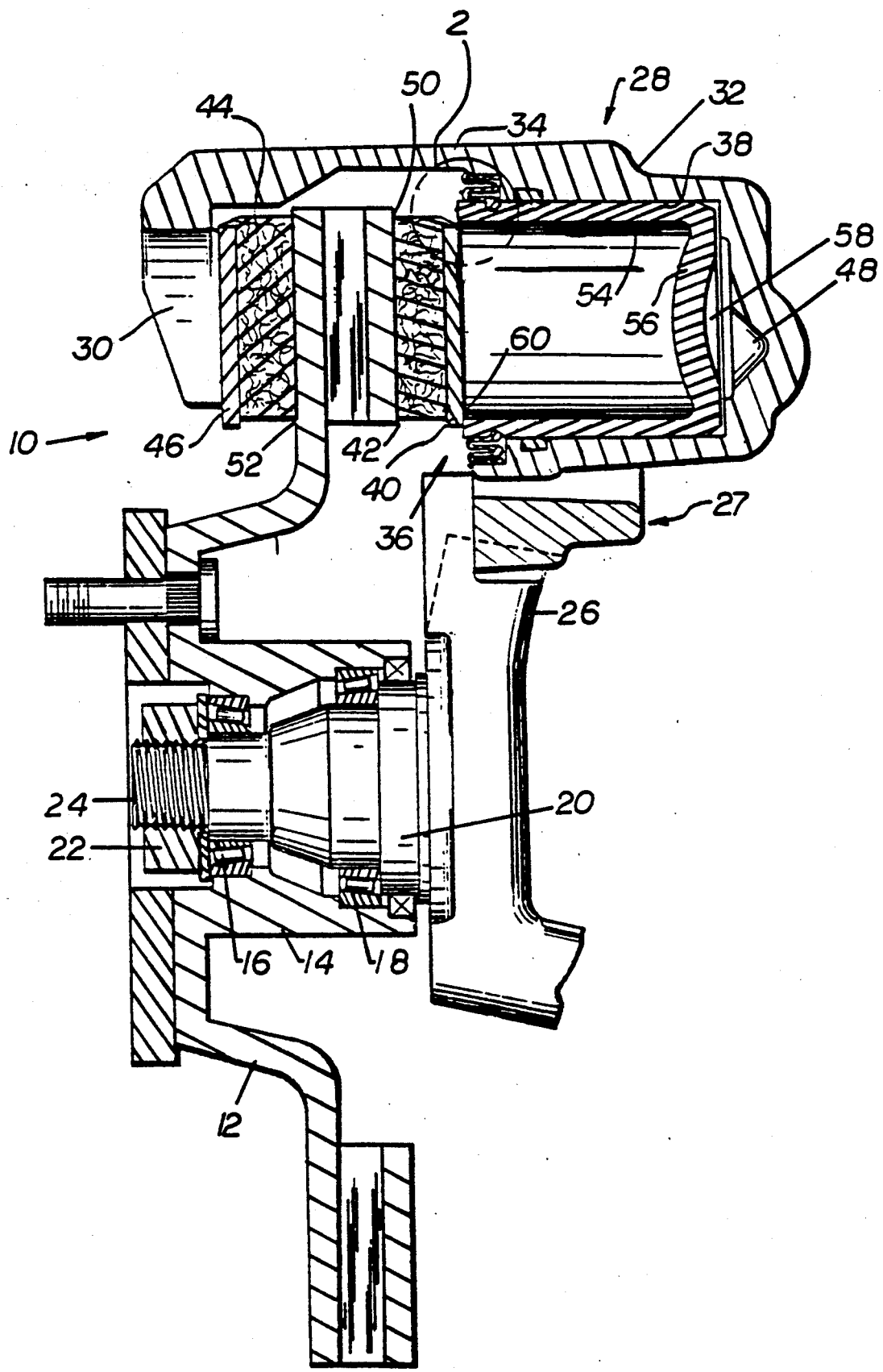
FIG. 1 is a sectional view of a disc brake with an actuation piston assembly made according to the principals of the present invention.

The disc brake 10 shown in FIG. 1 includes a rotor 12 with a hub 14 that is carried on bearings 16 and 18 located in a race on shaft or axle 20. A nut 22 is mated with threads 24 to hold rotor 12 on axle 20 which is fixed to the frame or other support 26 of a vehicle. A generally C-shaped caliper 28 which surrounds rotor 12 is secured to support 26 by an anchor plate 27. Caliper 28 has a front or outboard leg 30 and a rear or inboard leg 32 interconnected by a bridge portion 34. The inboard caliper leg 32 contains a hydraulic actuation piston assembly 36 which is located in bore 38 connected to a source of operational fluid. Piston assembly 36 engages backing plate 40 of the inboard friction pad 42 while an indirectly actuated outboard friction pad 44 has its backing plate 46 connected to outboard leg 30. When hydraulic fluid is supplied to bore 38 through inlet port 48 to chamber 58, piston assembly 36 moves inboard pad 42 into engagement with face 50 on rotor 12 in addition caliper 28 slides on pins to move backing plate 46 toward rotor 12 causing outboard pad 44 to engage face 52.

Anchor plate 27 has two axially and outward extending arms, only one of which is shown, which extend over the periphery of the rotor 12 and slidably support both the backing plate 40 for the inward friction pad 42 and backing plate 46 for the outward friction pad 44 on guide rails. In this disc brake 10 all braking friction torque is directly transferred by anchor plate 27 into support 26. Thus, the caliper 28 primarily serves as the structure for applying the necessary clamping forces to effect a brake application without the introduction of any forces created by rotative torque. Without the elastomeric ring 62 metal actuation ring 68 and cylindrical member 54 of the actuation piston assembly 36 of the present invention, during a brake application disc brake 10 typically would exhibit squeal or noise at various deceleration rates when friction pads 42 and 44 engage rotor 12 during a brake application. The squeal or noise is primarily the result of vibration and sliding produced by the reaction of the brake pads 42 and 44 with the rotor.

Figure 2:
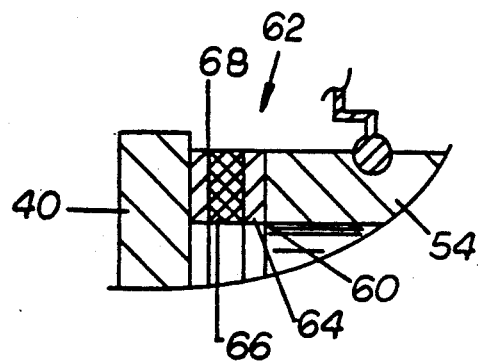
FIG. 2 is an enlarged view of circumscribed area 2 of FIG. 1.

In an effort to reduce the generation of noise during a brake application, the actuation piston assembly 36 shown in FIGS. 1 and 2 was developed. The actuation piston assembly 36 includes a cylindrical member 54 with a closed end 56 located in bore 38 and with bore 38 defines actuation chamber 58 and an opened end 60 which extends from bore 38. The actuation piston assembly 36 further includes a vibration attenuation ring 62 made up of an elastomeric ring 66 sandwiched between a first metal ring 64, and a second metal or actuation ring 68. The attenuation elastomeric ring 62 is attached to the end 60 of the cylindrical member 54. To reduce the transfer of thermal energy created during a brake application, metal rings 64 and 68 are made of low thermal conductive stainless steel of the AISI 300 Series while the elastomeric ring 66 is a butyl rubber which is at least 0.005 inches thick and has a modulus of elasticity of 5 MPa to 14 MPa.

Further, it is anticipated that the attenuation ring 62 could be made up of arcuate segments that could be attached to the end 60 of cylindrical member 54 by either a high temperature glue or brazing compound.

In order to evaluate the actuation piston assembly 36, two identical disc brakes 10 were placed on a test machine. One disc brake 10 had an attenuation ring 62 attached to the actuation piston assembly 36 and one disc brake was of a standard design.

Figure 6:
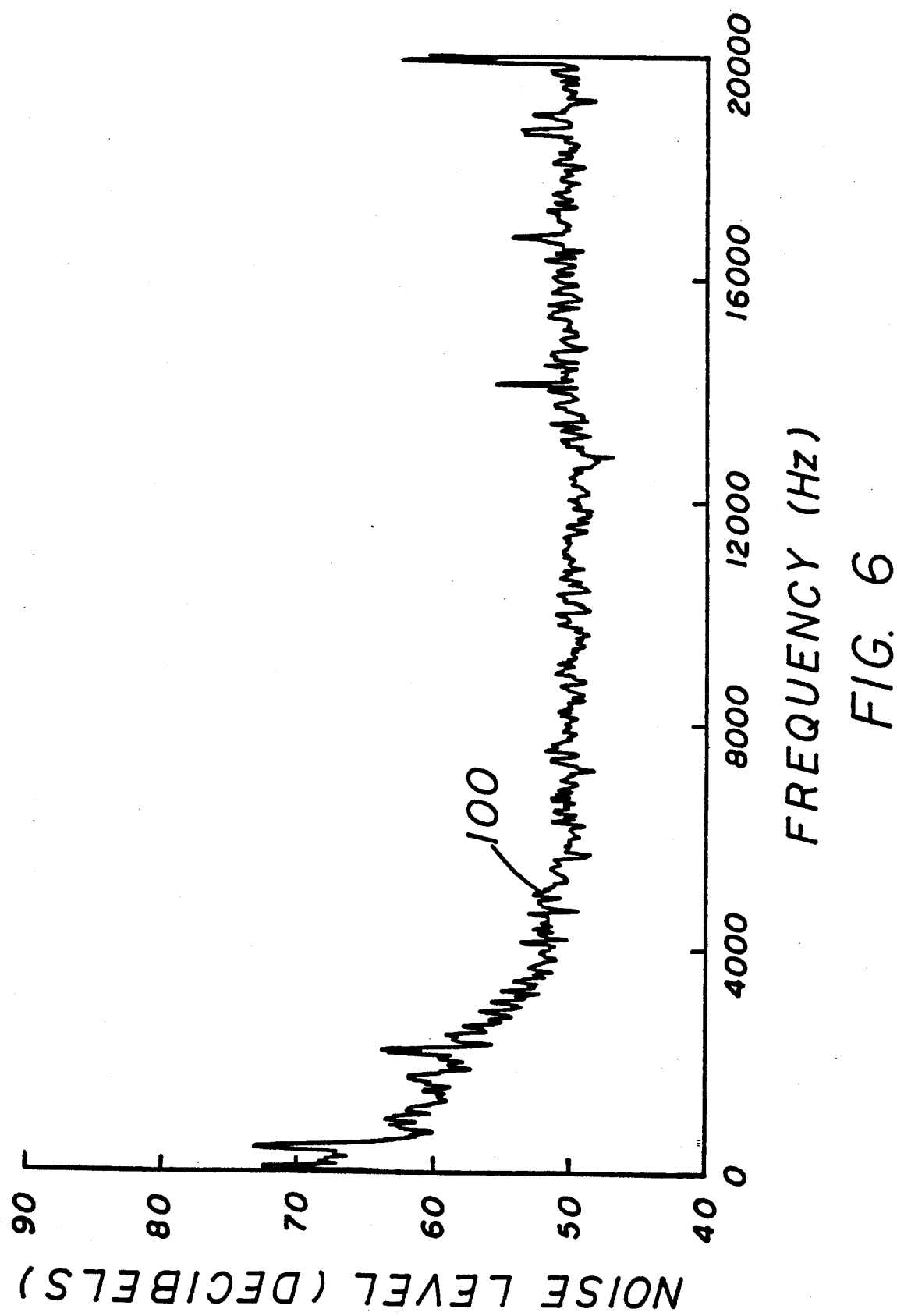
FIG. 6 is a graph which illustrate noise generated during a brake application using a state of the art brake assembly.
Figure 7:
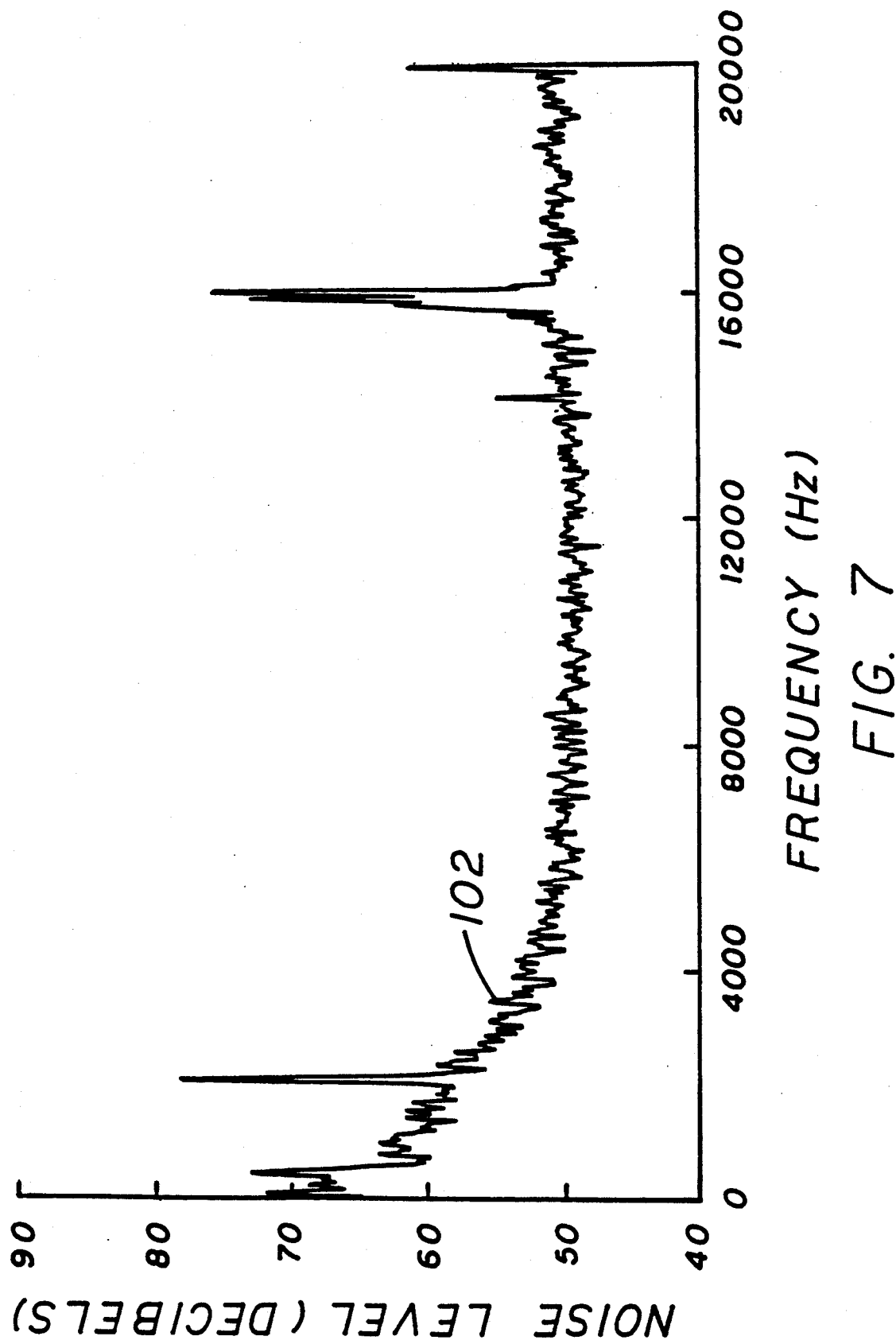
FIG. 7 is a graph which illustrates noise generated during a brake application with the brake assembly of the present invention.

Both the standard brake and brake 10 were actuated in accordance with Bendix standard test Schedule 129 and the noise created during such test measured on an inertia brake dynamometer. The audible sound of the disc brake 10 with the attenuation ring 62 is illustrated by curve 100 in FIG. 6 while the sound generated by a standard brake is illustrated by curve 102 in FIG. 7. As can be seen the attenuation ring 62 substantially eliminates noise near 2000 and 16000 $H_z$.

Figure 3:
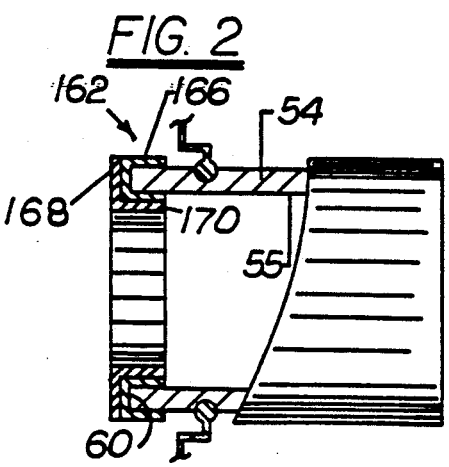
FIG. 3 is a section view of another embodiment of an actuation piston assembly for use in the disc brake of FIG. 1.

In an effort to evaluate additional attenuation rings for use with a piston assembly 36, an additional embodiment 162 shown in FIG. 3 was developed. In this embodiment, of an attenuation ring 162, the elastomeric butyl rubber component 166 surrounds the entire opened end 60 and extends up the peripheral surface of the cylindrical member 54 to form an end cap. Further a metal ring 168, through which the force is transferred into the backing plate 40, has an inwardly projecting flange 170 which extends into the inner surface 55 of cylindrical member 54. The flange 170 engages the elastomeric material on the inner surface 55 of the cylindrical member 54 and resiliently holds to metal ring 168 in the cylindrical member 54. In this embodiment 162, the actuation force is carried directly from the cylindrical member 54 into the elastomeric ring 166 to actuation ring 168 for moving the brake pad 42.

Figure 4:
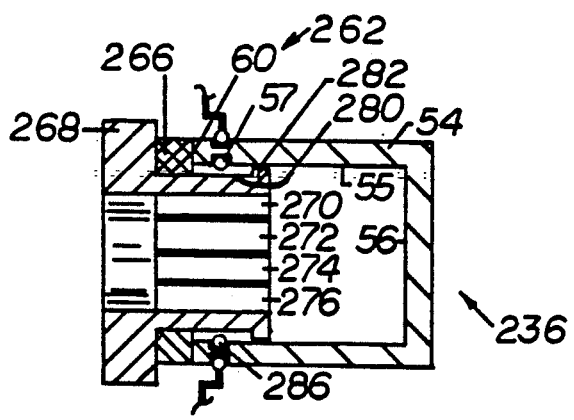
FIG. 4 is a sectional view of another embodiment of an actuation piston assembly for use in the disc brake of FIG. 1.

In the embodiment of the attenuation ring 262 shown in FIG. 4, the elastomeric ring 266 is also located adjacent opened end 60 of the cylindrical member 54. The physical size of the elastomeric ring 266 is larger than either elastomeric rings 66 and 166 shown in the embodiments of FIGS. 2 and 3. It is felt that larger vibrations may be better attenuated with a greater dimensional size in the axial plane for the elastomeric ring 266. The metal actuation ring 268 has a series of tabs 270, 272, 274, 276, etc. that extend from the base member. A groove 57 is located on inner surface 55 of the cylindrical member 54 adjacent the opened end 60. Similarly, a groove 280 is located in each tab 270, 272, 274, 276, etc. A snap ring 286 located in groove 57 expands and allows flange 282 on each tab to move into the cylindrical member 54 and attach the metal ring 268 to the cylindrical body 54. In response to operation hydraulic fluid supplied to chamber 58, piston assembly 236 would move to provide a force bringing brake pad 42 into engagement with rotor surface 50. Any vibration produced through this engagement would be carried through backing plate 40 into metal ring 268. With elastomeric ring 266 located adjacent metal ring 268 vibration are attenuated as vibration in actuation ring 267 are modified in elastomeric ring 266 before reaching cylindrical body 54 and as a result the creation of an audible noise is substantially reduced.

Figure 5:
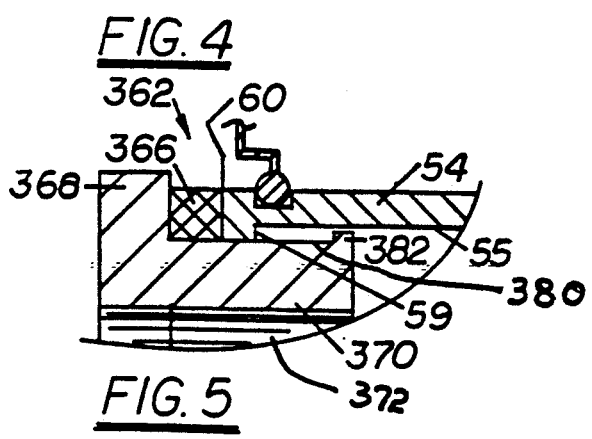
FIG. 5 is a sectional view of a further embodiment of the actuation piston assembly for the disc brake of FIG. 1.

The attenuation ring 362 shown in FIG. 5 is substantially identical with actuation ring 262 except the lip which holds the actuation ring 368 in piston 54 is formed by a flange 59 is located on the inner surface 55 of cylindrical member 54 adjacent opened end 60. Tabs 370, 372, and etc. that extend from metal ring 368 flex as flange 382 on each tab 370 is inserted into and move past flange 59 in the cylindrical member 54 to attach the attenuation ring 368 to the cylindrical member 54. As with the other embodiments, actuation forces from the cylindrical member 54 are carried through the elastomeric member 366 into the metal ring 368. Vibration created through the engagement of friction pad 42 with rotor surface 50 are carried back and attenuated in the elastomeric ring 366 to reduce the development of audible noise.

We claim:

1. In a disc brake assembly having a caliper with a bore therein for retaining an actuation piston assembly, said piston assembly providing a force to move a pair of brake pads into engagement with a rotor, said pads and rotor on engagement creating vibrations that produce audible sounds, the improvement in the actuation piston assembly comprising:

a cylindrical member located in said bore and having a closed end and an opened end, said cylindrical member having an inwardly projecting flange adjacent said opened end;

an elastomeric ring located adjacent the opened end; and an actuation ring which has a base member with a series of tabs that extend from a base, each of said tabs having an outwardly projecting flange, said inwardly projecting flange on said cylindrical member engaging said tabs for holding said elastomeric ring in alignment with said opened end, said actuation ring engaging one of said brake pads, said force being transmitted from said cylindrical member to said actuation ring through said elastomeric ring, said elastomeric ring permitting said actuation ring to move independently with respect to said cylindrical member by attenuating vibrations to reduce the creation of audible sounds.

2. The disc brake assembly as recited in claim 1, wherein said outward projecting flange of said series of tabs engage said inwardly projecting flange to prevent said actuation ring from being removed from said cylindrical member.

* * * * *